United States Patent [19]

Kikuchi et al.

[11] Patent Number: 5,958,128
[45] Date of Patent: Sep. 28, 1999

[54] METHOD OF MANUFACTURING A DISAZO PIGMENT AND DISAZO PIGMENT MANUFACTURED THEREBY

[75] Inventors: Yoshimi Kikuchi; Hitoshi Sugamo, both of Tokyo, Japan

[73] Assignee: Toyo Ink Manufacturing Co., Ltd., Tokyo, Japan

[21] Appl. No.: 08/945,266

[22] PCT Filed: Feb. 26, 1997

[86] PCT No.: PCT/JP97/00547

§ 371 Date: Oct. 24, 1997

§ 102(e) Date: Oct. 24, 1997

[87] PCT Pub. No.: WO97/31067

PCT Pub. Date: Aug. 28, 1997

[30] Foreign Application Priority Data

Feb. 26, 1996 [JP] Japan ........................... 8-37653
Feb. 26, 1996 [JP] Japan ........................... 8-37654

[51] Int. Cl.$^6$ ................................... C09B 27/00
[52] U.S. Cl. ..................... 106/496; 106/493; 534/575; 534/747; 534/887
[58] Field of Search .................. 106/496, 493; 534/575, 747, 887

[56] References Cited

U.S. PATENT DOCUMENTS 3,776,749  12/1973  McKay et al. ........................ 106/496
5,489,672   2/1996  Shiromaru et al. .................... 106/496

OTHER PUBLICATIONS

Derwent abstract 95–213166, file WPIDS, of JP07126545A, May, 1995.
Derwent abstract 92–004555, file WPIDS, of JP03258858A, Nov., 1991.

*Primary Examiner*—Mark L. Bell
*Assistant Examiner*—Scott L. Hertzog
*Attorney, Agent, or Firm*—Oblon, Spivak, McClelland, Maier & Neustadt, P.C.

[57] ABSTRACT

In the method of manufacturing a disazo pigment according to the present invention, a superior coupling reaction rate during the coupling reaction process makes it possible to manufacture a disazo pigment having superior transparency, brightness, color strength and gloss for the case in which a color strength agent is used. In this method, a coupling reaction is carried out while continuously feeding a coupler aqueous solution comprising a coupler component having the general formula (I) shown below and a tetrazo aqueous solution comprising a benzidine derivative tetrazo component at a molar ratio of 2:0.8~0.99 into an acidic aqueous solution held in a batch type mixing vessel.

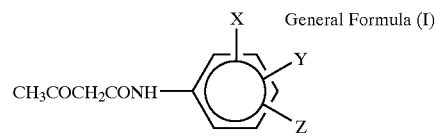

General Formula (I)

(where each of X, Y, Z independently represents H, $CH_3$, $OCH_3$, Cl)

17 Claims, No Drawings

METHOD OF MANUFACTURING A DISAZO PIGMENT AND DISAZO PIGMENT MANUFACTURED THEREBY

BACKGROUND OF THE INVENTION

1. Field of the Invention

The present invention relates to a method of manufacturing a disazo pigment for widespread use as a yellow pigment. In particular, the present invention relates to a disazo pigment manufacturing method which can provide a superior coupling reaction rate during the coupling reaction process in the manufacturing process, and to a disazo pigment which can be used for printing inks such as offset ink, gravure ink and the like to impart superior transparency, brightness, color strength and gloss thereto.

2. Description of the Prior Art

Disazo pigments are yellow pigments widely used in paints, printing inks, plastic colorings and the like. These pigments are obtained by carrying out a coupling reaction using a benzidine derivative tetrazo compound (hereinafter called "tetrazo") and acetoacetanilide referred to as the "coupler". This coupling reaction is carried out by adding a tetrazo aqueous solution to a weak acidic aqueous slurry containing coupler particles distributed therein.

Tetrazo is chemically unstable and can easily undergo decomposition and condensation. This is particularly severe when conditions are alkaline, in which case reduction takes place immediately. When conditions are strongly acidic, a high stability is obtained, but under these conditions the coupling reaction hardly proceeds at all. For this reason, coupling is carried out under weak acidic conditions, wherein the added tetrazo immediately reacts with all the coupler.

On the other hand, when the conditions are alkaline the coupler readily dissolves, but when the coupling reaction is carried out under weak acidic conditions, the solubility of the coupler is prety bad, and this results in most of the coupler remaining in the solid phase.

Accordingly, the coupling reaction is carried out as a solid-liquid reaction in which a tetrazo aqueous solution is added to a weak acidic aqueous slurry containing coupler particles distributed therein. As a result, for some reason or other the coupler does not readily dissolve, thus making it impossible to obtain a high reaction rate, as well as creating conditions that will cause unreacted coupler to remain in the pigment. Further, this unreacted coupler that remains in the pigment will decompose into an aromatic amine, thus creating conditions that will lead to greater problems, which include degradation of the pigment characteristics, such as a lowering of the color strength and the like.

SUMMARY OF THE INVENTION

By improving the coupling reaction rate, it is possible to increase yield and reduce the amount of unreacted compound. This reduction in unreacted compound, which can easily be carried out, not only improves the clearness and color strength of the pigment, but also results in easiness of its removal and a reduction of the aromatic amine produced by the decomposition of such unreacted compound. Accordingly, it is an object of the present invention to provide a disazo pigment manufacturing method having a superior coupling reaction rate during the coupling reaction process in order to provide a disazo pigment having superior transparency, brightness, color strength and gloss when used as a coloring agent.

The coupling reaction rate can be improved by well distributing fine particle of coupler into an aqueous slurry. In this connection, there are many techniques for creating a powdered coupler. For example, the coupler can be formed into a fine powder by adding an alkali aqueous solution comprising dissolved coupler to an acidic aqueous solution to reprecipitate the coupler out of solution or by mechanically milling the coupler using a sand mill or the like, with such finely powdered coupler being used to carry out a coupling reaction. Further, the improvement in the coupling reaction rate will be even higher if a surfactant is added to the reaction system when the coupler is being refined or when the coupling reaction is being carried out.

However, research conducted by the present inventors revealed that the improvement to the reaction rate achieved by such prior art coupling methods is not sufficient. Namely, while coupler dissolved in a weak acidic aqueous slurry is believed to undergo coupling at the beginning of the coupling process, because the rate at which coupler dissolves does not keep pace with the coupling rate, the amount of coupler dissolved in the weak acidic aqueous slurry decreases. Accordingly, the coupling reaction takes place near the surface of the coupler particles. In this state, the coupling-produced compound (i.e., the pigment) covers the surface of the coupler particles, thereby hindering the dissolution of the coupler and the coupling reaction. This phenomenon is particularly striking in the case where the tetrazo is supplied too quickly or when there is too much tetrazo present in the reaction system. If the reaction proceeds under these kinds of conditions, the coupler particles will be covered with the pigment by the time the coupling process reaches the final stage, and because this allows unreacted coupler particles to remain behind, the coupling reaction rate is effectively lowered. In addition to using a fine powdered coupler, this problem can be effectively prevented by carrying out a slow tetrazo feeding. Further, by adding a surfactant, it is possible to assist the dissolution of the coupler and prevent the formed pigment from adhering to the coupler particles. Moreover, it is possible to use a method in which the coupler covered by the pigment is forced to dissolve by carrying out additional mechanical grinding and dissolving steps. However, even though these methods are effective, they are either insufficient or require much cost and time to become sufficient, with other problems including loss of product quality and the like. Consequently, such methods are not sufficiently suitable for industrial manufacturing.

In response to such problems, the present inventors conducted extensive research to obtain a sufficiently high reaction rate, and in this way the present invention was achieved.

In this regard, the present invention provides a method of manufacturing a disazo pigment, in which a coupling reaction is carried out while continuously feeding a coupler aqueous solution comprising a coupler component having the general formula (I) shown below and a tetrazo aqueous solution comprising a benzidine derivative tetrazo component at a molar ratio of 2:0.8~0.99 into an acidic aqueous solution held in a batch type mixing vessel.

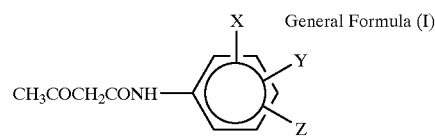

General Formula (I)

(where each of X, Y, Z independently represents H, $CH_3$, $OCH_3$, Cl)

The present invention also provides a method of manufacturing disazo pigment in which the molar ratio of coupler component having the general Formula (I) and tetrazo compound lies within the range 2:0.9~0.99.

The present invention also provides a method of manufacturing disazo pigment in which the step of feeding the coupler component is followed by a supplemental feeding of only the tetrazo aqueous solution.

The present invention also provides a method of manufacturing disazo pigment in which the acidic aqueous solution includes a pH buffer.

The present invention also provides a method of manufacturing disazo pigment in which the acidic aqueous solution includes a surfactant.

The present invention also provides a disazo pigment produced by the above described methods.

DETAILED DESCRIPTION OF THE PREFERRED EMBODIMENTS

In accordance with the manufacturing method of the present invention, a disazo pigment is manufactured by carrying out a coupling reaction on a coupler component and a tetrazo component simultaneously fed to an acidic aqueous solution.

The acidic solution used in this manufacturing process may be a coupling reaction system held at a pH of 3~6.5, with the preferred pH range being 3.5~6.3, and it is possible to use the well-known acidic aqueous solutions used in prior art coupling methods. It is necessary to hold the pH in this range in order to minimize side reactions such as decomposition and condensation of the tetrazo, and it is preferred that the aqueous solution be held in this pH range from the start of the coupling reaction to the end thereof. For this reason, an acid or alkali may be added intermittently or continuously during the reaction, but in terms of ease of operation, a pH buffer type aqueous solution system which keeps pH changes low, such as the acetic acid-sodium acetate system or formic acid-sodium formate system used in prior art coupling reactions, is preferred in order to make it easy to maintain the above-described pH ranges.

The tetrazo used in the present invention may be obtained from a benzidine type compound such as 3,3'-dichlorobenzidine, 2,2', 5,5'-tetrachlorobenzidine, 3,3'-dimethoxybenzidine, or 3,3'-disulfobenzidine which has undergone a well-known tetrazoization, with preparing as an acid aqueous solution.

An acetoacetanilide type compound is used for the coupler shown in the general formula (I), with specific examples including acetoacetanilide, acetoaceto-o-toluidide, acetoaceto-m-xylidide, acetoaceto-o-anisidide, acetoaceto-p-anisidide, acetoaceto-o-chloroanilide, chloroanilide, acetoaceto-2,5-dimethoxy-4-chloroanilide. The coupler is dissolved together with an alkali such as sodium hydroxide, with preparing as an alkali aqueous solution. A mixtuer solution of more than two kinds of coupler may be used.

The tetrazo aqueous solution and the coupler aqueous solution are simultaneously fed to an acidic aqueous solution in a batch type mixing vessel through separate respective feeding tubes. When the tetrazo aqueous solution and the coupler aqueous solution come into direct contact with each other, solid coupler deposits precipitate out of solution and create the same solid-liquid coupling reaction that occurs in the prior art, thereby lowering the reactivity and making it easy for side reactions and stains in the hue of the formed pigment to occur. In order to prevent this, the exit ports of the feeding tubes need to be spaced away from each other in a reaction vessel equipped with a batch type mixing vessel filled with the acidic aqueous solution, and in this way a sufficient mixing can carried out to achieve a reliable reaction of the tetrazo and the coupler components in the acidic aqueous solution. Further, the acidic aqueous solution may be removed from the reaction vessel and circulated to the outside, with such circulation lines either feeding the tetrazo aqueous solution and coupling solution or just one of such solutions to the reaction vessel and the other to the circulation line.

With respect to the reacting ratio of the coupler and the tetrazo, the coupling reaction is carried out by continuously feeding the coupler and the tetrazo in the molar ratio (coupling component:tetrazo component) range 2:0.8~0.99, and preferably in the range 2:0.9~0.99. In this regard, it is preferred that the supplied amount of tetrazo does not exceed the supplied amount of coupler. In this way, after the tetrazo is fed into the acidic aqueous solution, the tetrazo immediately undergoes an actual complete reaction with the coupler component, such that no unreacted tetrazo remains in the reaction system. As a result, side reactions due to decomposition and condensation of the tetrazo are also prevented. In this connection, because there is no need to hold this feeding ratio at a prescribed setting until the reaction time has entirely elapsed, the ratio may be changed while continuing to carry out such feeding. Further, it is possible to begin feeding the coupler aqueous solution after first feeding the tetrazo aqueous solution. Furthermore, after simultaneously feeding in the tetrazo and coupler, it is possible to cover the surface of the formed pigment particles with a resin by feeding in another compound such as rosin solution.

In this way, when the tetrazo and coupler components are fed together in the above-described ratios, absolutely no tetrazo remains in the reaction system at the end of the feeding time, but a small amount of coupler component capable of reaction remains behind. At this point, after simultaneous feeding is complete, it is possible to add just tetrazo so as to completely react the coupler component, and again it is possible to increase the coupling reaction rate.

When the coupler aqueous solution is being mixed with the acidic aqueous solution during the feeding of the coupler aqueous solution to the acidic aqueous solution, it is necessary to select conditions which will prevent the dissolved coupler component from precipitating out of solution. This is due to the fact that changes can be brought about by many factors, such as the type of reacting coupler and the concentration of the coupler aqueous solution, the feeding conditions, and the pH and quantity of acidic aqueous solution. However, it is possible to determine the optimum feeding quantity either experimentally or by taking the coupling reaction rate of both components and their diffusion rates and solubility in the acidic aqueous solution into consideration.

With regards to this manner of determining the coupler feeding quantity in the present invention, it is necessary to accurately control the tetrazo feeding quantity so as to keep the coupler component and tetrazo component molar ratio within the range 2:0.8~0.99 throughout all or most of the reaction process in order to satisfy conditions for obtaining an immediate coupling of the fed tetrazo and a high reaction rate. In order to make the chemical reaction quantities of the tetrazo and coupler during the coupling reaction lie within the ratio range described above, the control of the feeding ratio can be carried out by adjusting the concentration and flow rate of both solutions, in which is possible to carry out such adjustments with well-known general methods.

In addition to using a method based on a fixed volume pump and detection of flow rate for feedback control, the flow rate ratio can be controlled by detecting the concentration of the coupler dissolved in the reaction system. Further, in the method of controlling the flow rate of both solutions by detecting the concentration of dissolved coupler, it is possible to omit the fine concentration adjustment of the dissolved raw materials and obtain an even higher reaction rate. The concentration of coupler dissolved in the acidic aqueous solution can be calculated, for example, by examining such factors as the ultraviolet light absorbency and the color formation during coupling, and even though results differ depending on the type of coupler used, such as in the case of acetoaceto-2,5-dimethoxy-4-chloroanilide, in general it is preferred that the concentration be adjusted to about $2 \times 10^{-6} \sim 2 \times 10^{-4}$ moles/liter in order to obtain a high coupling reaction rate.

On the other hand, it is preferred in terms of operation and economy that the concentration of coupler aqueous solution lie within the range 0.1~1 moles/liter and that the concentration of the tetrazo aqueous solution lie within the range 0.05~0.8 moles/liter.

Further, the flow rate per minute of the coupler aqueous solution and the tetrazo aqueous solution with respect to the acidic aqueous solution is set to lie within a range that will prevent the coupler component in the acidic aqueous solution from precipitating out of solution, as described above. This range for preventing the coupler component from precipitating out of solution will change depending on various factors such as the type and pH of the acidic aqueous solution, the quantity and mixing conditions thereof, and the position of feeding, and for this reason the feeding quantity is determined by comprehensively considering the time and manufacturing steps required for manufacture. Namely, as the feeding quantity of the coupler aqueous solution is reduced with respect to the acidic aqueous solution, the prevention against the precipitation of the coupler component becomes better, but this is accompanied by a requirement for more time to manufacture the pigment because of the accompanying weakening in concentration in the reaction system, however, good results can generally be obtained within the weight standard range 1:10~1:2000.

The coupling reaction conditions such as temperature and pH values and the method of control thereof are not limited to those described in the present invention, and it is possible to select well-known condition values and control methods used in prior art coupling reactions. Further, it does not matter if the pH and temperature are either changed at the same time the time or feeding quantity is changed or kept constant from start to finish. Moreover, in the present invention, because the tetrazo acidic aqueous solution and the coupler alkali aqueous solution are added together, the dissolved amount of acid and alkali in these solutions and the flow rates thereof can be adjusted to neutralize each other, thereby making it possible to easily carry out a coupling reaction with the pH value held at the beginning pH value until the end of the reaction.

Further, because the surfactant used as an additive to the acidic aqueous solution in the present invention may be any surfactant that is effective at improving the coupler solubility or the stability in a super saturated state, there exist many effective surfactants unrelated to chemical structure such as cationic, anionic, nonionic, or amphoteric structure, from which a selection can be made by considering the cost, handling ease, quality of the obtained pigment and the like. Examples of such a surfactant include Emalgen 120 (manufactured by Kao, Inc.) and Aromox DMC-W (manufactured by Lion, Inc.). As for the amount of surfactant added, a small amount is effective, but to a certain degree a larger amount creates a bigger effect. In the case where a surfactant is used, the amount of surfactant used is determined by considering other factors in addition to the required reaction rate, such as cost and quality of the created pigment, and in general the effective amount of used surfactant can lie within the range of 0.2~10% parts by weight with respect to the weight of the created pigment.

The disazo pigment obtained in the acidic aqueous solution in this way can be removed from the reaction system either by carrying out a continuous solid/liquid separation or by carrying out a batch-type solid/liquid separation to recover the disazo pigment after the reaction has been completed. Further, it is possible to carry out a series of rosin treatments during the manufacture of the disazo pigment in order to improved the pigment characteristics of the disazo pigment.

Next, specific example embodiments according to the present invention will be presented. In these example embodiments, "portion" and "%" refer to "weight portion" and "% by weight", respectively.

A. Manufacture of Disazo Pigment (EXAMPLE EMBODIMENT 1)

Using a standard method, tetrazoization was carried out on 3,3-dichlorobenzidine hydrochloride using three times as many moles of hydrochloric acid and two times as many moles of sodium nitrite to obtain a 0.125 M tetrazo aqueous solution at 10°C. Meanwhile, 35.4 parts acetoacetanilide are dissolved in an aqueous solution containing 12 parts sodium hydroxide to create a 0.259 M coupler aqueous solution at 25° C. Further, 30 g of 80% acetic acid and 8 g of sodium hydroxide are added to water to form 500 g of a pH4.7 buffer solution at 24° C., with such buffer solution being placed in a reaction vessel equipped with a stirrer to serve as the acidic aqueous solution. Then, by means of a tetrazo aqueous solution feeding tube and coupler aqueous solution feeding tube arranged so that the outlet ports thereof are positioned away from each other, the tetrazo aqueous solution and the coupler aqueous solution are fed into the pH buffer solution through their respective feeding tubes. The feeding of these solutions is begun at the same time, and for 40 minutes thereafter these solutions are fed at the same flow rate (19.3 ml/minute) by means of a fixed volume pump, with the feeding of both solutions then being stopped at the same time. During this feeding, no tetrazo was detected in a sample of reaction solution taken from the surface of the solution. At such time, the coupler based coupling reaction rate was 96.5%. Thereafter, only the tetrazo aqueous solution was additionally fed until an extremely small amount of tetrazo was detected in the reaction system, and as a result the coupler based coupling reaction rate was 98.6%. In this connection, tetrazo detection was carried out using color reactions due to β-naphthol, and the coupling reaction rate was analyzed using a liquid chromatograph to determine the obtained amount of unreacted coupler.

Next, in accordance with standard methods, a 10% (to the coloring matter) rosin treatment (in which sodium hydroxide aqueous solution is added to the slurry obtained by the coupling described above to adjust the pH to 10.5, and then after adding 6.3 g of tall oil type rosin soap as a solidifying conversion, 12.6 g of 8% aluminum sulfate aqueous solution is added, with hydrochloric acid aqueous solution then being added to adjust the pH to 6.5) was carried out, and after heating the system to 70° C., the solution was filtered, purified, and then dried at 85° C. to obtain 68.2 g of pigment.

(COMPARATIVE EXAMPLE 1)

Using a standard method, tetrazoization was carried out on 3,3-dichlorobenzidine hydrochloride using three times as many moles of hydrochloric acid and two times as many moles of sodium nitrite to obtain a 0.125 M tetrazo aqueous solution at 10° C. Meanwhile, 35.4 parts acetoacetanilide are dissolved in an aqueous solution containing 14.4 parts sodium hydroxide to create a 0.259 M coupler aqueous solution at 25° C. Further, 30 g of 80% acetic acid was added to water to form 500 g of an acidic acid solution, with such solution being placed in a reaction vessel equipped with a stirrer to serve as the acidic aqueous solution. Then, the coupler aqueous solution was fed into this acidic aqueous solution at a flow rate of 19.3 ml/minute for 40 minutes to cause the coupler to precipitate out of solution. Then, with the outlet port of a feeding tube held in this coupler slurry, the tetrazo aqueous solution is fed into the coupler slurry at a flow rate of 18.4 ml/minute. Under these conditions, it takes approximately 40 minutes until a very small amount of tetrazo is detected at the surface of the reacting solution. In this case, the coupling reaction rate was 92.1%. Then, after carrying out the same rosin treatment, heating, filtering, purification and drying steps as was done in Example Embodiment 1, 63.7 g of pigment was obtained.

(EXAMPLE EMBODIMENT 2)

Except for using a 0.259 M coupler aqueous solution at 25° C. obtained by dissolving 38.2 parts acetoaceto-o-toluidide in an aqueous solution containing 12 parts sodium hydroxide, the same coupling as was described above in Example Embodiment 1 was carried out. At that point, the coupling reaction rate was 96.5%. Thereafter, only the tetrazo aqueous solution was additionally fed until the amount of tetrazo in the reaction system was confirmed to be extremely small, and as a result the coupling reaction rate was 98.5%. Then, after heating the system to 70° C., the solution was filtered, purified, and then dried at 85° C. to obtain 64.7 g of pigment.

(COMPARATIVE EXAMPLE 2)

Except for using a 0.259 M coupler aqueous solution at 25° C. obtained by dissolving 38.2 parts acetoaceto-o-toluidide in an aqueous solution containing 12 parts sodium hydroxide, the same coupling as was described above in Comparative Example 1 was carried out. The coupling reaction rate was 92.0%. Then, after heating the system to 70° C., the solution was filtered, purified, and then dried at 85° C. to obtain 60.4 g of pigment.

(EXAMPLE EMBODIMENT 3)

Using a standard method, tetrazoization was carried out on 3,3-dichlorobenzidine hydrochloride using three times as many moles of hydrochloric acid and two times as many moles of sodium nitrite to obtain a 0.125 M tetrazo aqueous solution at 10° C. Meanwhile, 54.3 parts acetoaceto-2,5-dimethoxy-4-chloroanilide are dissolved in an aqueous solution containing 12 parts sodium hydroxide to create a 0.259 M coupler aqueous solution at 25° C. Further, 30 g of 80% acetic acid, 8 g of sodium hydroxide and 2.4 g of Aromox DMD-W (trademark product manufactured by Lion, Inc.), which is a nonionic surfactant that is an effective component conversion, are added to water to form 500 g of a pH4.7 buffer solution at 24° C., with such buffer solution being placed in a reaction vessel equipped with a stirrer to serve as the acidic aqueous solution. Then, by means of a tetrazo aqueous solution feeding tube and coupler aqueous solution feeding tube arranged so that the outlet ports thereof are positioned away from each other, the tetrazo aqueous solution and the coupler aqueous solution are fed into the pH buffer solution through their respective feeding tubes. The feeding of these solutions is begun at the same time, and for 40 minutes thereafter these solutions are fed at the same flow rate (19.3 ml/minute) by means of a fixed volume pump, with the feeding of both solutions then being stopped at the same time. During this feeding, no tetrazo was detected in a sample of reaction solution taken from the surface of the solution. At such time, the coupler based coupling reaction rate was 96.3%. Thereafter, only the tetrazo aqueous solution was additionally fed until an extremely small amount of tetrazo was detected in the reaction system, and as a result the coupler based coupling reaction rate was 98.5%. Then, after heating the system to 70° C., the solution was filtered, purified, and then dried at 85° C. to obtain 80.6 g of pigment.

(EXAMPLE EMBODIMENT 4)

Except for using the nonionic surfactant Emalgen 120 (trademark product manufactured by Kao, Inc.) as the surfactant, the results of this example embodiment are roughly the same as those in Example Embodiment 3, and in this case the coupling reaction rates were respectively 96.3% and 97.3%, with 80.2 g of pigment being obtained.

(EXAMPLE EMBODIMENT 5)

Except for using twice the amount of surfactant and a 0.252 M coupler aqueous solution, this embodiment is roughly the same as Example Embodiment 3. During simultaneous feeding, no tetrazo was detected in a sample of reaction solution taken from the surface of the solution, and the coupling reaction rate up until the completion of simultaneous feeding of tetrazo aqueous solution and coupling aqueous solution was 99.2%. Then, after just adding tetrazo, the coupling reaction was 99.5%, and 81.2 g of pigment were obtained.

(COMPARATIVE EXAMPLE 3)

Using a standard method, tetrazoization was carried out on 3,3-dichlorobenzidine hydrochloride using three times as many moles of hydrochloric acid and two times as many moles of sodium nitrite to obtain a 0.125 M tetrazo aqueous solution at 10° C. Meanwhile, 54.3 parts acetoaceto-2,5-dimethoxy-4-chloroanilide are dissolved in an aqueous solution containing 14.4 parts sodium hydroxide to create a 0.259 M coupler aqueous solution at 25° C. Further, 30 g of 80% acetic acid and 2.4 g of Aromox DMD-W (trademark product manufactured by Lion, Inc.), which is a nonionic surfactant that is an effective component conversion, are added to water to form 500 g of an acidic solution, with such solution being placed in a reaction vessel equipped with a mixing vessel to serve as the acidic aqueous solution. Then, the coupler aqueous solution was fed into this acidic aqueous solution at a flow rate of 19.3 ml/minute for 40 minutes to cause the coupler to precipitate out of solution. Then, with the outlet port of a feeding tube held in this coupler slurry, the tetrazo aqueous solution is fed into the coupler slurry at a flow rate of 18.4 ml/minute. Under these conditions, it takes approximately 40 minutes until a very small amount of tetrazo is detected at the surface of the reacting solution. In this case, the coupling reaction rate was 91.8%. Then, after heating the system to 70° C., the solution was filtered, purified, and then dried at 85° C. to obtain 73.1 g of pigment.

B. Disazo Pigment Evaluation (EXPERIMENT 1)

An offset ink test was performed on the pigments obtained from Example Embodiment 1 and Comparative Embodiment 1. Namely, after premixing 80 g of offset ink vehicle and 20 g of powdered pigment in a paper cup, the mixture was ground with a three-roll mill. After grinding, roughly 10 g of vehicle/ink solvent was added to adjust the ink tone so as to create a tack of 6.0, whereby a deep color was obtained. This base color ink was then evaluated as described below.

1. Transparency

Each base color ink was drawn down to create color specimens. A visual inspection of both color specimens confirmed the deep color ink made from the pigment of Example Embodiment 1 to have a superior transparency.

2. Brightness and Color Strength

Two grams of each base color ink was mixed with 5.0 g of white ink (made by distributing titanium oxide in the above-described vehicle) to create two light color inks. These light color inks were then drawn down to create color specimens. A visual inspection of both color specimens confirmed the light color ink made from the pigment of Example Embodiment 1 to have a higher brightness and color strength.

3. Gloss

Each of the base color inks were printed to art paper using an RI tester, and 60° gloss measurements were carried out by means of a gloss meter (UGV-5D, manufactured by Suga Testing Devices, Inc.). As a result, compared to the 68.5% achieved by Comparative Example 1, Example Embodiment 1 had a high gloss of 71.2%.

(EXPERIMENT 2)

A Gravure ink test was performed on the pigments obtained from Example Embodiment 2 and Comparative Example 2. In this regard, 90 g of nitrocellulose flexographic ink vehicle and 10 g of pigment powdered by a 60 mesh metal screen were added to a 220 ml glass vial, and then after 100 g of 3 mmφ glass beads were added, a distribution operation using a Red Devil distributing device was carried out for one hour. Then, the obtained inks were applied to triacetate film to create color specimens. These color specimens were evaluated in terms of transparency, brightness, color strength and gloss in the same manner as was done in Experiment 1 described above. As a result, compared to the pigment of Comparative Example 2, the pigment of Example Embodiment 2 had superior transparency, brightness and color strength. Further, compared to the 105.2% 60° gloss achieved by Comparative Example 2, Example Embodiment 2 had a superior 60° gloss of 121.5%.

(EXPERIMENT 3)

The amounts of unreacted coupler and aromatic amine were measured for the pigments obtained from Example Embodiments 3, 4 and 5 and Comparative Example 3. Then, 0.25 g of pigment was distributed ultrasonically in 25 ml of THF, which was then centrifuged to obtain a supernatant liquid which was then subjected to qualitative and quantity analysis. Further, a gravure ink test was carried out on each pigment. In this regard, the manufacture of the inks and the creation of the color specimens were carried out in the same manner as was done for Example Embodiment 2.

These color specimens were evaluated in terms of transparency, brightness, color strength and gloss in the same manner as was done in Experiment 1 described above.

These results are shown in Table 1.

TABLE 1

| | | | Gravure Ink Test*) | | | |
|---|---|---|---|---|---|---|
| | Coupler ppm | Amine ppm | Trans-parency | Bright-ness | Color Strength | Gloss |
| | | | (compared with C.E.E.3**)) | | | |
| Example Embodiment 3 | 426 | 151 | TP | HB | HC | 125.5 |
| Example Embodiment 4 | 8837 | 171 | TP | HB | HC | 124.8 |
| Example Embodiment 5 | 56 | 70 | TP | HB | HC | 127.7 |
| Comparative Example Embodiment 3 | 45700 | 1670 | — | — | — | 107.6 |

*) TP: transparent, HB: highly bright, HC: high concentration
**) C.E.E.3: Compared Example Embodiment 3

As shown in Table 1, compared to Comparative Example 3, the pigments obtained from Example Embodiments 3 through 5 have less unreacted coupler and aromatic amines and have superior transparency, brightness, gloss and color strength as determined by a gravure ink test.

In the present invention, as described above, by carrying out a coupling reaction in which tetrazo aqueous solution and coupler aqueous solution are continuously fed at roughly the same chemical molar amounts into an acidic aqueous solution inside a batch type mixing vessel, it is possible to obtain a sufficiently high coupling reaction, whereby it becomes possible to manufacture an offset ink, gravure ink or the like having superior transparency, brightness, color strength and gloss.

Further, because the coupler also takes part in the reaction in a roughly dissolved state, it is possible to carry out coupling at a sufficiently high coupling reaction rate, and this makes it possible to obtain a disazo pigment containing very little aromatic amine.

Finally, it is to be understood that the present invention is not limited to the embodiments described above and that many changes and additions may be made thereto without departing from the scope and spirit of the invention as defined in the appended claims.

What is claimed is:

1. A method of manufacturing a disazo pigment, in which a coupling reaction is carried out while continuously feeding a coupler aqueous solution comprising a coupler component having the general formula (I) shown below and a tetrazo aqueous solution comprising a benzidine derivative tetrazo component at a molar ratio of 2:0.8~0.99 into an acidic aqueous solution held in a batch type mixing vessel

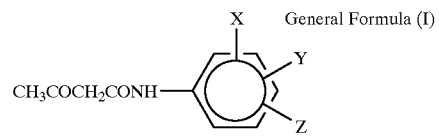

General Formula (I)

where each of X, Y, Z independently represents H, $CH_3$, $OCH_3$, Cl.

2. The method of manufacturing disazo pigment of claim 1, wherein the molar ratio of coupler component and tetrazo compound lies within the range 2:0.9~0.99.

3. The method of manufacturing disazo pigment of claim 1, in which the step of continuously feeding the coupler component and the tetrazo compound is followed by a supplemental feeding of only the tetrazo aqueous solution.

4. The method of manufacturing disazo pigment of claim 1, wherein the acidic aqueous solution held in the batch type mixing vessel includes a pH buffer.

5. The method of manufacturing disazo pigment of claim 1, wherein the concentration of the coupler aqueous solution fed into the acidic aqueous solution is 0.1~1 mole/liter and the concentration of the tetrazo aqueous solution is 0.05~0.8 moles/liter.

6. The method of manufacturing disazo pigment of claim 1, wherein the standard mass flow rate per minute of the coupler aqueous solution and the tetrazo aqueous solution fed to the acidic aqueous solution lies in the ratio range of 1:10~2000.

7. The method of manufacturing disazo pigment of claim 1, wherein the coupler component is at least one compound selected from the group consisting of acetoacetanilide, acetoaceto-o-toluidide, acetoaceto-o-anisidide, acetoaceto-p-anisidide and acetoaceto-o-chloroanilide.

8. The method of manufacturing disazo pigment of claim 1, wherein the coupler component includes acetoaceto-2,5-dimethoxy-4-chloroanilide.

9. The method of manufacturing disazo pigment of claim 1, wherein the acidic aqueous solution held in the batch type mixing vessel includes a surfactant.

10. The method of manufacturing disazo pigment of claim 9, wherein the molar ratio of coupler component and tetrazo compound lies within the range 2:0.9~0.99.

11. The method of manufacturing disazo pigment of claim 9, in which the step of continuously feeding the coupler component and the tetrazo compound is followed by a supplemental feeding of only the tetrazo aqueous solution.

12. The method of manufacturing disazo pigment of claim 9, wherein the acidic aqueous solution held in the batch type mixing vessel includes a pH buffer.

13. The method of manufacturing disazo pigment of claim 9, wherein the concentration of the coupler aqueous solution fed into the acidic aqueous solution is 0.1~1 mole/liter and the concentration of the tetrazo aqueous solution is 0.05~0.8 moles/liter.

14. The method of manufacturing disazo pigment of claim 9, wherein the standard mass flow rate per minute of the coupler aqueous solution and the tetrazo aqueous solution fed to the acidic aqueous solution lies in the ratio range of 1:10~2000.

15. The method of manufacturing disazo pigment of claim 9, wherein the coupler component is at least one compound selected from the group consisting of acetoacetanilide, acetoaceto-o-toluidide, acetoaceto-o-anisidide, acetoaceto-p-anisidide and acetoaceto-o-chloroanilide.

16. The method of manufacturing disazo pigment of claim 9, wherein the coupler component includes acetoaceto-2,5-dimethoxy-4-chloroanilide.

17. A disazo pigment obtained by the manufacturing method of claim 1.

* * * * *